United States Patent
Stroik, Jr.

(10) Patent No.: US 9,038,935 B2
(45) Date of Patent: May 26, 2015

(54) PROGRESSIVE LOAD LIMITER

(75) Inventor: Gary Lee Stroik, Jr., Swartz Creek, MI (US)

(73) Assignee: TK Holdings Inc., Auburn Hills, MI (US)

( * ) Notice: Subject to any disclaimer, the term of this patent is extended or adjusted under 35 U.S.C. 154(b) by 290 days.

(21) Appl. No.: 13/419,284

(22) Filed: Mar. 13, 2012

(65) Prior Publication Data

US 2012/0234958 A1 Sep. 20, 2012

Related U.S. Application Data

(60) Provisional application No. 61/452,611, filed on Mar. 14, 2011.

(51) Int. Cl.
*B60R 22/28* (2006.01)
*B60R 22/34* (2006.01)

(52) U.S. Cl.
CPC ......... *B60R 22/341* (2013.01); *B60R 2022/287* (2013.01)

(58) Field of Classification Search
CPC .. B60R 22/28; B60R 22/341; B60R 22/4676; B60R 2022/287

USPC .............................. 242/397.1; 280/806; 297/478
See application file for complete search history.

(56) References Cited

U.S. PATENT DOCUMENTS

| | | | |
|---|---|---|---|
| 5,967,441 A * | 10/1999 | Kohlndorfer et al. | 242/379.1 |
| 6,568,621 B2 * | 5/2003 | Hiramatsu et al. | 242/379.1 |
| 8,006,927 B2 * | 8/2011 | Heitkamp | 242/379.1 |
| 8,220,735 B2 * | 7/2012 | Wang et al. | 242/374 |
| 8,286,903 B2 * | 10/2012 | Ogawa et al. | 242/379.1 |
| 2011/0121120 A1 * | 5/2011 | Ogawa et al. | 242/379.1 |

* cited by examiner

*Primary Examiner* — Sang Kim
(74) *Attorney, Agent, or Firm* — Foley & Lardner LLP

(57) ABSTRACT

A retractor includes a spool configured to selectively wind and unwind the webbing, a lock base configured to operate in a free position and a locked position, a first energy absorbing member coupled to the spool and the lock base, and a second energy absorbing member coupled to the spool and the lock base. When the lock base is in the free position, the spool and lock base freely rotate together when a force is applied on the spool through the webbing. When the lock base is in the locked position and a force is applied on the spool through the webbing, rotation of the spool is permitted while rotation of the lock base is prevented, such that the first energy absorbing member absorbs a first energy and the second energy absorbing member is configured to absorb a second energy after a predetermined rotation of the spool.

13 Claims, 3 Drawing Sheets

PROGRESSIVE LOAD LIMITER

CROSS-REFERENCE TO RELATED PATENT APPLICATIONS

This application claims the benefit of and priority to U.S. Provisional Patent Application No. 61/452,611, which was filed on Mar. 14, 2011. U.S. Provisional Patent Application No. 61/452,611 is incorporated by reference herein in its entirety.

BACKGROUND

The present application relates generally to the field of retractors for use in occupant restraint systems. More specifically, this application relates to progressive load limiting devices for use in seatbelt systems to restrain occupants.

Seatbelt systems for vehicles typically include an energy management feature to absorb or reduce the kinetic energy of the seat belt system. For example, the seat belt systems for the front seats of a vehicle typically include seat belt retractors with devices to absorb or reduce the kinetic energy of a seat belt during an event, such as a collision in which the bodily weight of a seat occupant may be applied to the seat belt as the vehicle is suddenly decelerated. By reducing the kinetic energy of the seat belt, such as by slowing an unwinding rate of the seat belt and/or reducing a force applied to the seat belt may provide improved performance.

For example, conventional seat belt retractors typically utilize a torsion bar to absorb or reduce the kinetic energy of the seat belt retractor and thus the seat belt. One type of retractor which uses a torsion bar is a retractor with a single torsion bar, which reduces kinetic energy to a certain level. Another type of retractor is a digressive system which initially reduces kinetic energy by a relatively large amount but then switches so that kinetic energy is reduced by a relatively smaller amount after a certain number of rotations of the spool of the retractor.

The digressive retractor system is particularly useful for large occupants who can initially exert a large amount of force to a seat belt during an event, such as during a collision when a vehicle is suddenly decelerated. However, such digressive systems do not provide the best performance for smaller sized vehicle occupants, who would exert relatively smaller forces on a seat belt during an event.

One possible solution is to use a seat belt retractor with a torsion bar which reduces the kinetic energy of the retractor and seat belt by a relatively small amount which corresponds to the amount of energy produced by a small occupant. However, although such a design may provide good results when tested for small occupants, such a design might not provide good results when tested for relatively large occupants due to the relatively large forces and relatively large amounts of kinetic energy that such large occupants can produce.

SUMMARY

One embodiment of this application relates to a retractor having a rotatable spool configured to selectively wind and unwind the webbing around the spool, a lock base configured to operate in a free position and a locked position, a first energy absorbing member coupled to the spool and the lock base, and a second energy absorbing member coupled to the spool and the lock base. When the lock base is in the free position, the spool and lock base are configured to freely rotate together when a force is applied on the spool through the webbing. When the lock base is in the locked position and a force is applied on the spool through the webbing, rotation of the spool is permitted while rotation of the lock base is prevented, such that the first energy absorbing member absorbs a first energy and the second energy absorbing member is configured to absorb a second energy after a predetermined angular rotation of the spool.

Another embodiment of this application relates to a retractor having a rotatable spool configured to selectively wind and unwind the webbing around the spool, a lock base configured to operate in a free position and a locked position, a first energy absorbing member coupled to the spool and the lock base, and a second energy absorbing member having a first element interconnected to a second element through a threaded connection. The first element is operatively coupled to the spool and has a shoulder that is separated by a distance from an opposing shoulder of the second element. The second element is operatively coupled to the lock base. When the lock base is in the free position, the spool and lock base are configured to freely rotate together when a force is applied on the spool through the webbing. When a force is applied on the spool through the webbing when the lock base is in the locked position, rotation of the spool is permitted while rotation of the lock base is prevented, such that the first energy absorbing member absorbs a first energy and the second energy absorbing member is configured to absorb a second energy after the shoulder of the first element contacts the shoulder of the second element.

Yet another embodiment of this application relates to a retractor having a rotatable spool configured to selectively wind and unwind the webbing around the spool, a lock base configured to operate in a free position and a locked position, a first energy absorbing member coupled to the spool and the lock base, and a second energy absorbing member having a first end operatively coupled to the spool and a second end operatively coupled to the lock base. The second end has a shoulder that is separated from the lock base by a distance. When the lock base is in the free position, the spool and lock base are configured to freely rotate together when a force is applied on the spool through the webbing. When a force is applied on the spool through the webbing when the lock base is in the locked position, rotation of the spool is permitted while rotation of the lock base is prevented, such that the first energy absorbing member absorbs a first energy and the second energy absorbing member is configured to absorb a second energy after the shoulder of the second energy absorbing member contacts the lock base.

DETAILED DESCRIPTION

Referring generally to the Figures, disclosed herein are seat belt retractor mechanisms or retractors for use in occupant restraint systems, such as seatbelt systems, configured to provide multiple levels of energy absorption through a progressive load limiting device. For example, the retractor may be configured to initially absorb or reduce the kinetic energy of the seat belt retractor by a relatively small amount and may also be configured to subsequently absorb or reduce the kinetic energy of the seat belt retractor by a larger amount. In other words, the retractor may be configured to provide a first level of energy management to absorb a first amount of energy and may also be configured to provide a second level of energy management to absorb a second amount of energy. A retractor configured to provide multiple levels of energy absorption may advantageously provide improved performance in reducing the kinetic energy of the retractor and a seat belt coupled to the retractor for both relatively large occupants and relatively small occupants. Accordingly, the retractor may be configured to restrain both small and large occupants.

According to an exemplary embodiment, the retractor includes a frame (not shown), a spool configured to rotate relative to the frame, a first energy absorbing member, a second energy absorbing member, and a lock base configured to selectively rotate relative to the frame. The frame may be configured to couple the retractor to another vehicle component, such as to a seat assembly, and the frame may be configured to structurally support the retractor. The lock base is configured to operate in a first (e.g., free) mode of operation and a second (e.g., locked) mode of operation. In the first mode of operation, the lock base may rotate with the spool relative to the frame. In the second mode of operation, the lock base is locked to the frame to prohibit rotation of the lock base relative to the frame. The first energy absorbing member is operatively coupled to the spool and to the lock base, so that the first energy absorbing member may absorb up to a first amount of energy (e.g., torque) when the lock base is in the second or locked mode of operation. The second energy absorbing member is operatively coupled to the spool and to the lock base, so that the second energy absorbing member may absorb up to a second amount of energy (e.g., torque) when the lock base is in the second or locked mode of operation.

Figure 1:
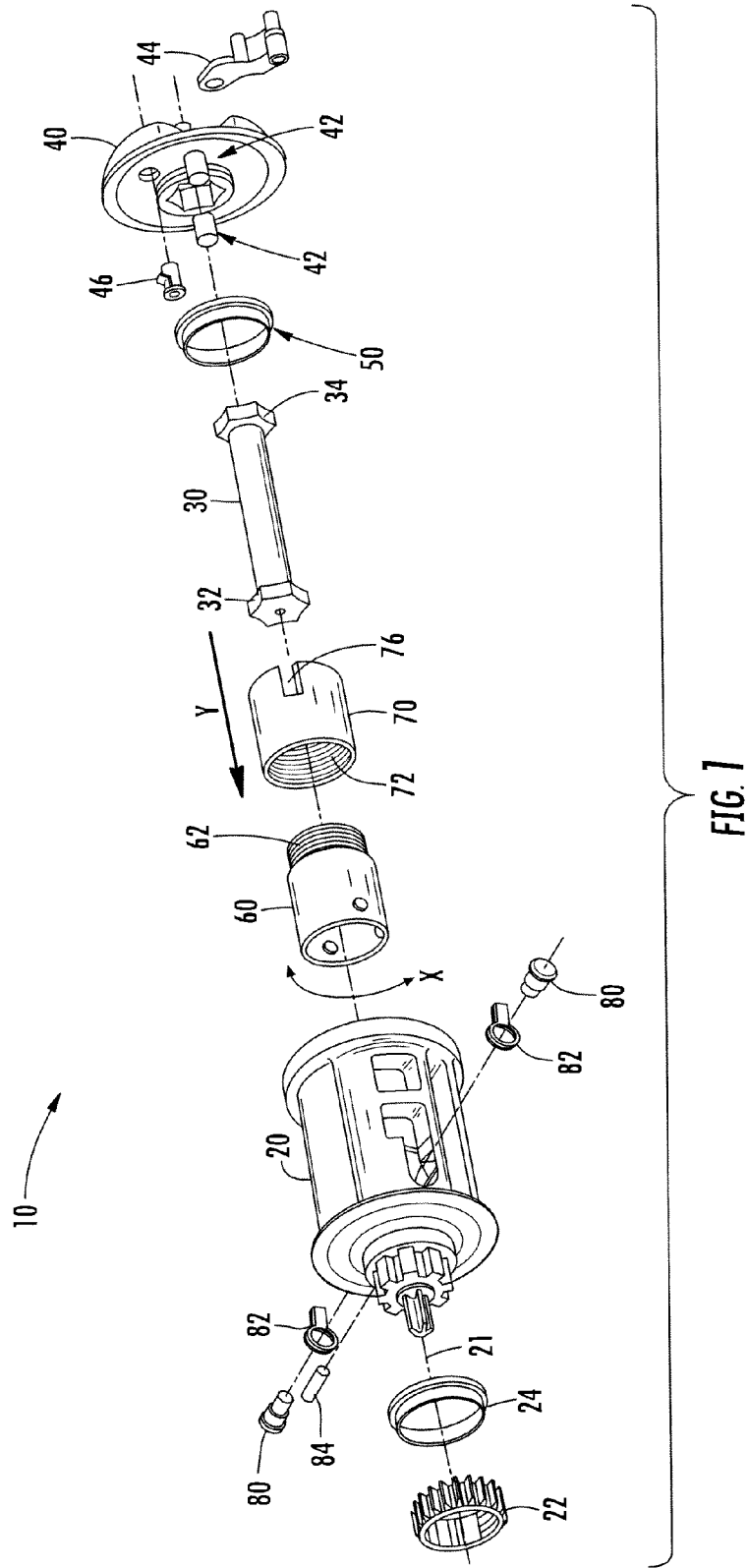
FIG. 1 is an exploded view of an exemplary embodiment of a seat belt retractor for use in an occupant restraint system.

FIGS. 1 and 2 illustrate an exemplary seat belt retractor 10 for use in an occupant restraint system, such as a seat belt system. The seat belt retractor 10 includes a spool 20 which a seat belt or webbing (not shown) may be coupled or connected to. The spool 20 may be pivotally supported by the frame (not shown) to allow rotation of the spool 20 about a pivot axis 21 relative to the frame. The seat belt is configured to wind about and unwind from the spool 20, such as an exterior surface 20*a* of the spool 20, when the spool 20 is rotated relative to the frame of the retractor 10. For example, the seat belt may be extracted or unwound from the spool 20 when the spool 20 is rotated in a seat belt unwinding direction, and the seat belt may be retracted or wound around the spool 20 when the spool 20 is rotated in a seat belt winding direction.

The seat belt retractor 10 may include a pinion 22 and/or a bearing 24, such as to connect the seat belt retractor 10 to another device, such as a motor (not shown), a gear system, or any suitable device. For example, the bearing 24 may pivotally couple the spool 20 to the frame of the retractor 10. Also for example, the pinion 22 may engage through a gear mesh a drive gear (not shown), which may be operatively coupled to a pretensioning device that is configured to pretension the seat belt, such as during a vehicle deceleration, through the gears.

The retractor 10 includes a lock base 40 that is configured to selectively rotate, such as about the pivot axis 21 relative to the frame of the retractor 10. The retractor 10 may also include a lock pawl 44 configured to move between locking and unlocking positions. When in the locking position, the lock pawl 44 prohibits rotation of the lock base 40 relative to the frame. When in the unlocking position, the lock pawl 44 allows the lock base 40 to freely rotate, such as with the spool 20 relative to the frame. The lock pawl 44 may be attached to the lock base 40, such as by a pin 46. The pin 46 may be configured to lock the lock base 40 in place when the lock pawl 44 is in the locking position.

The retractor 10 may also include a bearing 50 to allow for efficient rotation of the lock base 40, such as relative to the spool 20. Accordingly, the bearing 50 may be provided (e.g., located) between the lock base 40 and the spool 20, where the bearing 50 is in sliding (e.g., rotating) contact with the lock base 40 and/or the spool 20. This arrangement may allow for relative rotation between the lock base 40 and the spool 20 in an efficient manner (i.e., with reduced friction). The bearing 50 may also be provided between the spool 20 and an energy absorbing member (e.g., second energy absorbing member) to allow efficient relative rotation therebetween.

Figure 2A:
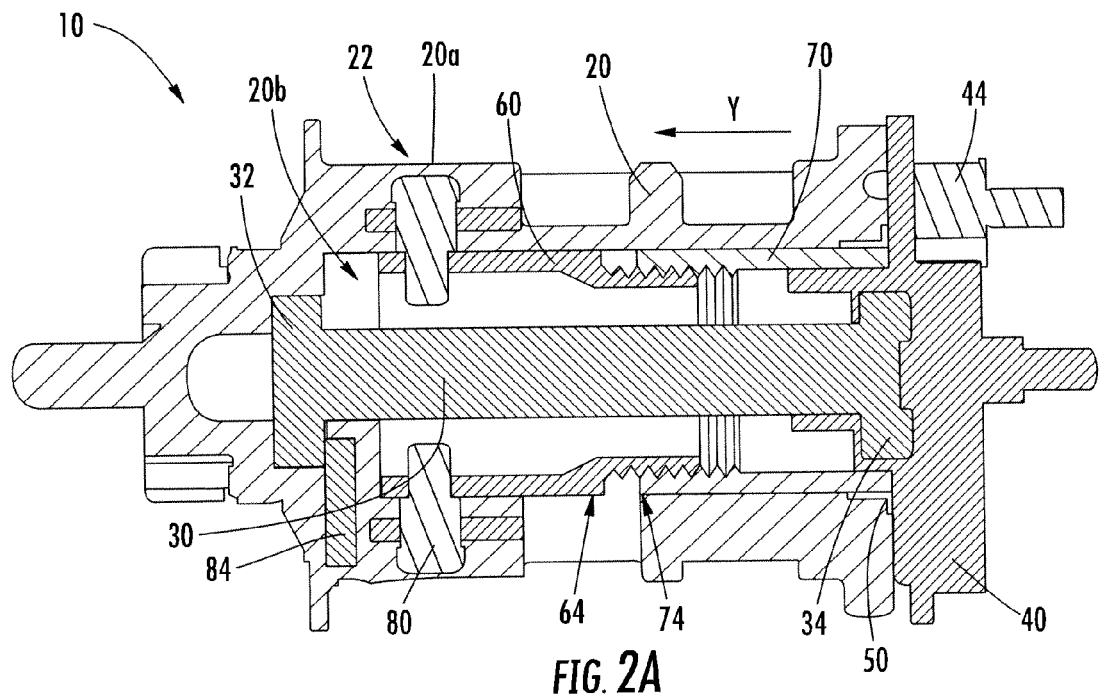
FIG. 2A is a cross-sectional view of the seat belt retractor of FIG. 1.

The retractor 10 includes a first energy (e.g., torque) absorbing member configured to absorb a first amount of energy to provide the retractor 10 with a first level of energy management. As shown, the first energy absorbing member is configured as a torsion bar 30 having a first end 32 and a second end 34. The first end 32 of the torsion bar 30 may be operatively coupled (e.g., connected, attached) to the spool 20, and the second end 34 may be operatively coupled (e.g., connected, attached) to a lock base 40, as shown in FIG. 2A. The ends 32, 34 may include features (e.g., splines, key-ways, etc.) that are configured to engage mating features of the spool 20 and lock base 40, respectively, to transmit torque. Thus, the torsion bar 30 may transfer torque from the spool 20 to the lock base 40. However, it should be noted that the first energy absorbing member may be configured differently than disclosed herein and the examples disclosed herein are not limiting.

The retractor 10 may also include a connecting member to connect the first energy absorbing member to the spool 20. For example, the retractor 10 may include a spring pin 84 configured to connect the torsion bar 30 to the spool 20. The pin 84 may be configured to retain the location of the torsion bar 30 along the pivot axis 21 relative to the spool 20, as the end 32 of the torsion bar 30 engages the spool 20 to transmit torque from the spool 20 to the torsion bar 30.

The retractor 10 may also include a second energy (e.g., torque) absorbing member configured to absorb a second amount of energy to provide the retractor 10 with a second level of energy management. As shown in FIGS. 1 and 2, the second energy absorbing member includes a first torsion element 60 and a second torsion element 70. As shown, the first and second torsion elements 60, 70 are configured as (i.e., in the form of) hollow pipes. However, the first and second torsion elements 60, 70 may be configured having any suitable configuration and/or shape, such as tubes or cylinders.

The first and second torsion elements 60, 70 may be configured to be connected together (e.g., interconnected) to cooperate in absorbing energy (e.g., torque) to provide the retractor 10 with a second energy management capability, such as a second level of energy management. For example, the first torsion element 60 may include a threaded section 62 that is configured to thread to a mating threaded section 72 of the second torsion elements 70. As shown, the first torsion element 60 includes an end 62 having external threads that are configured to thread to an end 72 of the second torsion element 70 having internal threads to operatively connect the first and second torsion elements 60, 70.

The first and second torsion elements 60, 70 of the second energy absorbing member may be interconnected in an initial state or first mode of operation, which may correspond to the first (e.g., initial) mode of operation of the retractor 10. In the initial or first mode of operation of the second energy absorbing member, the first and second torsion elements 60, 70 are interconnected such that the first and second torsion elements 60, 70 may move (e.g., rotate) independently (i.e., relative to the other element) a set amount (e.g., angular rotation). In other words, during the initial mode of operation of the second energy absorbing member, the first and second torsion elements 60, 70 are coupled together (e.g., through the threaded connection), but the first and second torsion elements 60, 70 are not locked together. FIG. 2A illustrates an example of this arrangement, where the first torsion element 60 may rotate relative to the second torsion element 70 a preset (e.g., predetermined) amount without absorbing energy in the second energy absorbing member.

Figure 2B:
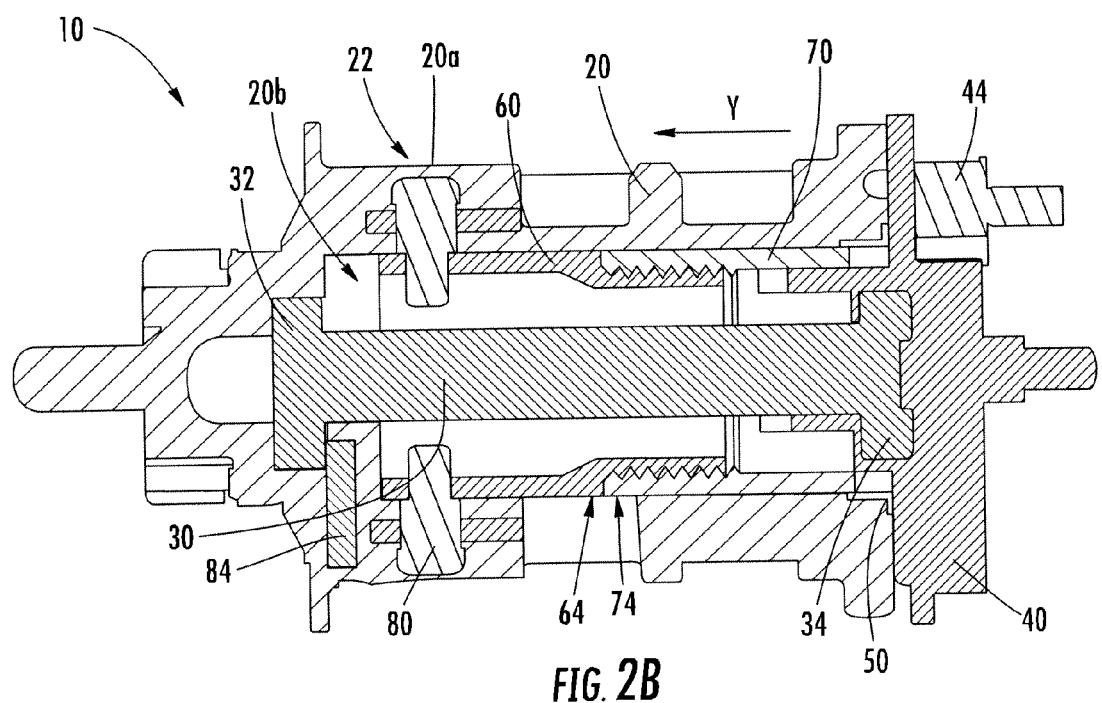
FIG. 2B is another cross-section view of the seat belt retractor of FIG. 1.

As shown in FIGS. 2A and 2B, the first torsion element 60 may include a shoulder 64 that is configured to oppose a shoulder 74 of the second torsion element 70. Thus, the shoulders 64, 74 may be located on the respective torsion elements 60, 70 at substantially similar distances (e.g., radii) from the pivot axis 21. During the first or initial mode of operation of the retractor (and second energy absorbing member), the first and second torsion elements 60, 70 may be interconnected having the shoulders 64, 74 separated or spaced apart by a distance, as shown in FIG. 2A. The distance of separation between the elements 60, 70 permits the first torsion element 60 and/or the second torsion elements 70 to move (e.g., rotate through the threaded connection) relative to the other torsion element to thereby move the shoulders 64, 74 closer together without the second energy absorber absorbing energy (or at least not more than a negligibly low amount of energy including friction). Thus, the first and second torsion elements 60, 70 may be configured to screw together, such as under loading of one element, until the shoulders 64, 74 contact and engage one another, as shown in FIG. 2B, which causes the first and second torsion elements 60, 70 to be locked together. Upon contact between the shoulders 64, 74, the first and second elements 60, 70 become fixed or locked together, wherein the second energy absorber operates in a second mode of operation to absorb energy and transmit torque. It should be noted that the distance of separation between the shoulders 64, 74 in the initial position may be tailored, such as to tailor the performance of the retractor 10 having the second energy absorbing member.

The torsion elements 60, 70 may be arranged within an interior of the spool 20, with the torsion bar 30 extending through the interior of the torsion elements. As shown, the spool 20 includes a cavity 20b disposed within the exterior surface 20a, where the cavity 20b is configured to receive the torsion bar 30, the first torsion element 60, and the second torsion element 70. The first and second torsion elements 60, 70 being configured as hollow pipes permit the torsion bar 30 to extend through the hollow opening through the torsion elements, to create a nested fit in order to reduce the over package size (e.g., volume) of the retractor 10.

The first torsion element 60 may be connected (e.g., attached, secured, etc.) to the spool 20, such that first torsion element 60 is configured to rotate with the spool 20. As shown, the first torsion element 60 is connected to the spool 20 through a fastener 80 (e.g., a screw, a bolt, etc.) and a stopper or washer 82. However, the first torsion element 60 may be connected to the spool 20 using other methods or members.

The second torsion element 70 may be connected (e.g., attached, secured, etc.) to the lock base 40. For example, the lock base 40 may include projections 42 which extend toward and engage with the second torsion element 70, such as by being inserted into slots 76 of the second torsion element 70. Further, the second torsion element 70 may be connected or attached to the lock base 40 in a manner which resists rotation of the second torsion element 70 in a direction X indicated in FIG. 1 but permits axial movement of the second torsion element 70, such as in a direction Y indicated in FIG. 1. For example, this can be accomplished by inserting the projections 42 into the slots 76 of the second torsion elements 70 but permitting the projections 42 to be partially withdrawn from the slots 76 as the second torsion element 70 is moved in the axial direction Y, while maintaining engagement between the projections 42 and the slots 76.

An exemplary discussion of the operation of the invention will now be provided with reference to the drawings. During a vehicle event, such as a collision or impact, an occupant induces a force that is exerted on a seat belt attached to the spool 20 of the seat belt retractor 10, which in turn causes the seat belt to exert a force in the seat belt unwinding direction so that the spool 20 is rotated in the seat belt unwinding direction.

During this event, the torsion bar 30 also rotates in the seat belt unwinding direction because one end 32 of the torsion bar 30 is connected to the rotating spool 20. However, during the event the lock base 40 will become engaged in a locked state or locked mode of operation, such as due to the engagement of the lock pawl 44 into a locked position. Because the other end 34 of the torsion bar 30 is connected to the locked, substantially non-rotating lock base 40, the torsion bar 30 will resist the rotation of the spool 20 as the torsion bar 30 is twisted by the rotation of the spool 20 and the substantially non-rotation of the lock base 40. This causes the torsion bar 30 to absorb and reduce some of the kinetic energy of the seat belt at a relatively low level as the spool 20 is initially rotated during the event.

Also during this event, the first torsion element 60 also rotates in the direction X indicated in FIG. 1, because the first torsion element 60 is connected to or attached to the spool 20, such as by one or more screws 80. However, the second torsion element 70 resists the rotation of the spool 20, since it is connected or attached to the lock base 40, which is configured in the locked mode of operation. For example, the lock base 40 can include projections 42 which extend toward and engage with the second torsion element 70, such as by being inserted into slots 76 of the second torsion element 70, which resists rotation of the second torsion element 70 in the direction X but permits the second torsion element 70 to move axially along the pivot axis 21 in the direction Y. This axial movement of the second torsion element 70 permits the torsion elements to accommodate lengthening of the torsion bar 30 as the torsion bar 30 is twisted by the rotation of the spool 20, which causes the torsion bar 30 to elongate in a direction substantially parallel to its longitudinal axis.

The first and second torsion elements 60, 70 are also connected to each other such that the first and second torsion elements 60, 70 are initially not locked together (as shown in FIG. 2A) but will become locked (as shown in FIG. 2B) after a predetermined number of rotations of the spool 20. For example, the first and second torsion elements 60, 70 can include threaded ends 62, 72 which are engaged, as shown in FIGS. 2A and 2B. Thus, in this example, the first and second torsion elements 60, 70 are initially connected together such that when one of the first and second torsion elements 60, 70 rotates in the direction X the other torsion element will be drawn towards the rotating torsion element in an axial direction Y.

For example, as the first torsion element 60 is rotated in the direction X by the rotation of the spool 20, the second torsion element 70 resists this rotation by its connection or attachment to the lock base 40. However, the second torsion element 70 is permitted to move in the axial direction Y, which permits the second torsion element 70 to advance toward the first torsion element 60, such as during the initial rotations of the spool 20 (corresponding to the initial operation of the retractor and event). For example, if the first and second torsion elements 60, 70 are interconnected through respective threaded ends 62, 72 engaged with one another, then the rotation of the first torsion element 60 in conjunction with the (substantial) non-rotation of the second torsion element 70 will cause the threads of the threaded end 72 of the second torsion element 70 to advance along the threads of the threaded end 62 of the first torsion element so that the second torsion element 70 is moved along the axial direction Y, as shown in the example of FIG. 2A.

As discussed herein, the first and second torsion elements 60, 70 are initially connected to or engaged with one another so that the first and second torsion elements are not locked to one another during the initial operation of the retractor 10 during the initial rotations of the spool 20 during the event. For example, the first and second torsion elements 60, 70 may include respective shoulders 64, 74 which are spaced apart from one another during the initial operation of the retractor 10 during the event.

The first and second torsion elements 60, 70 are also interconnected together such that the first and second torsion elements 60, 70 will become locked together after a predetermined number of rotations of the spool 20. Once the first and second torsion elements 60, 70 have become locked together, the first and second torsion elements 60, 70 operate together (e.g., cooperate) to resist additional rotation of the spool 20 and in so doing absorb and reduce the kinetic energy of the spool 20 and the seat belt, such as by deforming elastically and/or plastically during continued loading in torsion. Furthermore, the first and second torsion elements 60, 70, once locked together will absorb and reduce the kinetic energy by a larger amount and to a greater degree relative to the torsion bar 30. In other words, the torsion bar 30 of the retractor 10 is configured to absorb a first amount of energy during an initial stage of loading and the locked first and second torsion elements 60, 70 are configured to absorb a second amount of energy after the initial stage of loading. Thus, during a vehicle event, the retractor 10 may initially absorb or reduce kinetic energy by a first (relatively small) amount during its initial operation and may then subsequently absorb or reduce kinetic energy by a second amount, which is greater than the first amount.

For example, as the first torsion element 60 is rotated and the second torsion element 70 is moved in the direction Y, the shoulders 64, 74 will advance towards one another as the spool 20 is rotated until the shoulders 64, 74 engage one another. Once the shoulders 64, 74 of the first and second torsion elements 60, 70 have become engaged, the first and second torsion elements 60, 70 are locked together so that the first torsion element 60, like the second torsion element 70 which is connected or attached to the locked lock base 40, also resists the rotation of the spool 20 so that the first and second torsion elements 60, 70 absorb or reduce the kinetic energy of the spool 20 and the seat belt, such as by a second amount that is relatively higher than the amount absorbed by the torsion bar 30 during the initial operation of the retractor 10.

The retractor 10 may be configured to effectively switch from its first level of energy management, such as provided by the torsion bar 30, to its second level of energy management, such as provided by the first and second torsion elements 60, 70. For example, the retractor 10 may be configured to switch from the absorption or reduction of a relatively small amount of energy (e.g., kinetic) to a relatively greater amount of energy (e.g., kinetic) after a predetermined number of rotations of the spool 20. Further, the number of rotations of the spool 20 at which this switch occurs can be modified to accommodate various situations and various occupants of different sizes. For example, the connection between the first and second torsion elements 60, 70 can be modified, such as by increasing or decreasing the numbers of threads on the threaded ends 62, 72 of the first and second torsion elements 60, 70 so that the shoulders 64, 74 are further apart or closer together, or the first and second torsion elements 60, 70 can simply be screwed together more or less to set their initial distance from one another.

Figure 3:
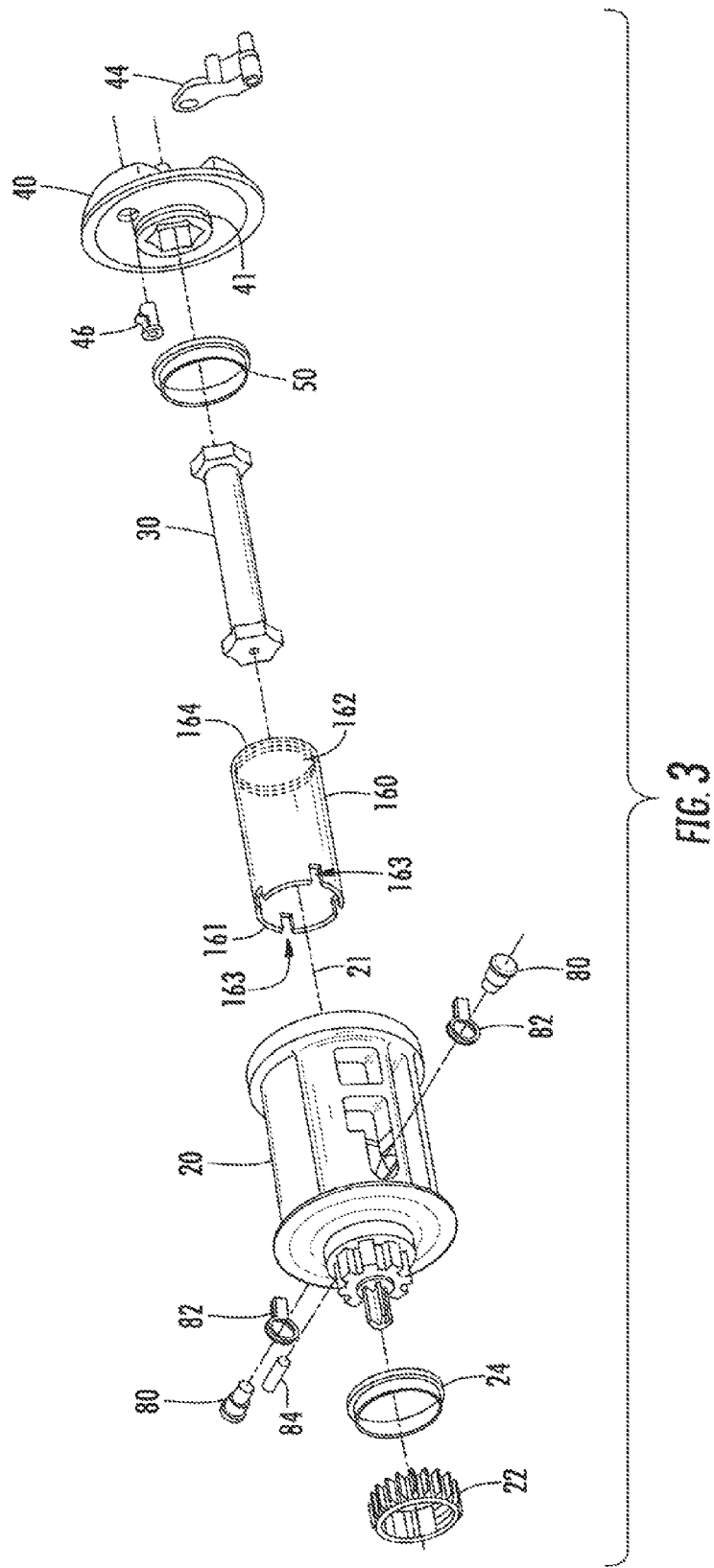
FIG. 3 is an exploded view of another exemplary embodiment of a seat belt retractor for use in an occupant restraint system.

The second energy absorber of the retractor 10 may be configured as a unitary (i.e., one-piece) member, rather than a two-piece member. As shown in FIG. 3, the second energy absorber 160 is configured as a unitary tube (e.g., pipe) having a first end 161 and a second end 162. The first end 161 is configured to be operatively coupled to the spool 20, such as through a fastener 80 (e.g., a screw). For example, the first end 161 may include a slot 163 that is configured to operatively couple the second energy absorber 160 to the spool 20 through a screw 80, such that the second energy absorber 160 is rotational coupled to the spool 20 yet the second energy absorber 160 may slide axially (i.e., along the pivot axis 21) relative to the spool 20. In other words, the second energy absorber 160 may be configured to rotate with the spool 20 about the pivot axis 21, and the second energy absorber 160 may move in a direction along the pivot axis 21 relative to the spool 20. As another example, the first end 161 may include a pair of opposing slots 163 that are configured to operatively couple the second energy absorber 160 to the spool 20 through a pair of opposing screws 80, such that the second energy absorber 160 is rotational coupled to the spool 20 yet the second energy absorber 160 may slide axially (i.e., along the pivot axis 21) relative to the spool 20. It should be noted that the second energy absorber may be configured having any number of pieces, sections, or members, and the examples disclosed herein are not limiting. The second energy absorber may also be operatively coupled to the spool 20 through the use of other members (e.g., a pin 84) and/or through other methods. For example, the retractor 10 may include any number of screws and the screws may have any arrangement or alignment.

The second end 162 of the second energy absorber 160 is configured to be operatively coupled to the lock base 40. The second end 162 may be interconnected to the lock base 40 through a threaded connection or through any suitable connection. For example, the second end 162 may include internal threads that are configured to engage (i.e., thread to) mating threads disposed on the lock base 40. The mating threads may be disposed on a shoulder 41 (e.g., an extension) of the lock base 40, such as on an external surface of the shoulder 41 to engage the internal threads of the second end 162 of the second energy absorbing member, or may have any suitable configuration.

The second energy absorber 160 may be interconnected to the lock base 40 such that there is a gap or spacing provided between an end surface 164 of the second end 162 and the shoulder 41 of the lock base 40. The distance of the spacing or gap between the end surface 164 and the shoulder 41 may be tailored or tunable, such as based on the length of webbing that is extracted (e.g., paid out) before the end surface 164 of the second energy member 160 becomes in direct contact with the shoulder 41 of the lock base 40. When the lock base 40 is in the unlocked position, the rotation of the spool 20 may rotate the second energy absorber 160 and the lock base 40 together. Thus, when the lock base 40 is in the unlocked position, the second energy absorber 160 of the retractor 10 may not carry any load or absorb energy. When the lock base 40 is initially locked (i.e., initially moved into the locked position) the lock base 40 no longer rotates freely, wherein rotation of the spool 20, such as induced by an occupant loading the webbing during a vehicle deceleration, rotates the second energy absorber 160 relative to the lock base 40 twisting (e.g., screwing) the second energy absorber 160 toward the lock base 40. The second energy absorber 160 continues to rotate relative to the lock base 40 until the gap or spacing between the end surface 164 and the shoulder 41 is eliminated and the end surface 164 and shoulder 41 are in direct contact. Upon such direct contact between the end surface 164 and the shoulder 41, the second energy absorber 160 transmits a torque (e.g., a second torque of retractor 10) from the spool 20 to the lock base 40. Accordingly, in this arrangement, the second energy absorber 160 absorbs a load (e.g., a second load of the retractor 10) and an amount of energy (e.g., a second amount of energy) when the lock base 40 is in the locked position, such as to provide the retractor 10 with a second level of energy management.

As a result, the retractor 10 may initially absorb or reduce kinetic energy by a relatively small amount during an event, which is useful for accommodating relatively smaller sized occupants, but will subsequently absorb or reduce kinetic energy by a greater amount, which can accommodate occupants of a larger size, for which the initial amount of energy absorption or reduction may not be fully sufficient.

The retractors disclosed herein may be compatible with currently produced seat belt systems and therefore can be retrofit into existing vehicles with minimal changes. For example, the retractors disclosed herein may be configured to use the same spool as a digressive retractor, which permits relatively simple and economic installation. Further, the retractors disclosed herein accomplish absorption or reduction of kinetic energy (e.g., a first level of energy absorption, a second level of energy absorption) with a minimal amount of electronics or electrical components, or none, in comparison to conventional retractors, which provides a simple, economical design for a retractor which switches from one amount of kinetic energy absorption or reduction to another. In addition, because the first and second torsion elements (or unitary second energy absorber and lock base) can be initially aligned with one another, there is no need to align the first and second torsion elements prior to the switch from the initial amount of energy absorption or reduction to the second, greater amount. Such an alignment problem can occur in retractor systems which switch energy absorption or reduction amounts, but is advantageously addressed by the retractors disclosed herein.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the retractor mechanisms and systems as shown in the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A retractor for use in an occupant restraint system having a seatbelt webbing, the retractor comprising:
    a rotatable spool configured to selectively wind and unwind the webbing around the spool;
    a lock base configured to operate in a free position and a locked position;
    a first energy absorbing member coupled to the spool and the lock base; and
    a second energy absorbing member coupled to the spool and the lock base;
    wherein when the lock base is in the free position, the spool and lock base are configured to freely rotate together when a force is applied on the spool through the webbing; and
    wherein when the lock base is in the locked position and a force is applied on the spool by the webbing, energy is initially absorbed by only the first energy absorbing member and wherein after the spool rotates at least a predetermined amount the second energy absorbing member begins to absorb energy.

2. The retractor of claim 1, wherein the second energy absorbing member includes a first torsion element interconnected with a second torsion element, the first torsion element being operatively coupled to the spool and the second torsion element being operatively coupled to the lock base.

3. The retractor of claim 2, wherein the connection between the first and second torsion elements is a threaded connection.

4. The retractor of claim 3, wherein the first torsion element includes a shoulder that is separated by a distance from a shoulder of the second torsion element prior to the force being applied on the spool through the webbing when the lock base is in the locked position.

5. The retractor of claim 4, wherein the shoulder of the first torsion element is configured to be brought into contact with the shoulder of the second torsion element during loading of the spool whereby the second energy absorbing member absorbs the second energy.

6. The retractor of claim 4, wherein the second torsion element includes a slot on the end to slideably engage a projection of the lock base to permit the second torsion element to move in an axial direction relative to the lock base.

7. The retractor of claim 1, wherein the second energy absorbing member includes a first end having a slot to slideably couple the second energy absorber to the spool, and a second end having threads that operatively couple to the lock base through a threaded connection.

8. The retractor of claim 7, wherein the second end of the second energy absorbing member also includes an end surface that is separated by a distance from the lock base prior to the force being applied on the spool through the webbing when the lock base is in the locked position.

9. The retractor of claim 8, wherein the end surface of the second end is configured to be brought into contact with the lock base during loading of the spool whereby the second energy absorbing member absorbs the second energy.

10. A retractor for use in an occupant restraint system having a seatbelt webbing, the retractor comprising:
a rotatable spool configured to selectively wind and unwind the webbing around the spool;
a lock base configured to operate in a free position and a locked position;
a first energy absorbing member coupled to the spool and the lock base; and
a second energy absorbing member having a first end operatively coupled to the spool and a second end operatively coupled to the lock base;
wherein when the lock base is in the free position, the spool and lock base are configured to freely rotate together when a force is applied on the spool through the webbing, an end surface of the second end of the second energy absorbing member is separated from the lock base by a distance, and the second end is operatively coupled to the lock base; and
wherein when a force is applied on the spool by the webbing when the lock base is in the locked position, rotation of the spool is permitted while rotation of the lock base is prevented, such that the first energy absorbing member absorbs a first energy and the second energy absorbing member is configured to absorb a second energy after the end surface of the second energy absorbing member contacts the lock base.

11. The retractor of claim 10, wherein the first end of the second energy absorbing member has a slot that is configured to slideably couple the second energy absorbing member to the spool, such that the second energy absorbing member is rotationally coupled to the spool yet may move in an axial direction relative to the spool.

12. The retractor of claim 10, wherein the second end of the second energy absorbing member is operatively coupled to the lock base through a threaded connection.

13. The retractor of claim 12, wherein the second energy absorbing member includes internal threads that thread to external threads of the lock base.

* * * * *